United States Patent [19]
Cornelius et al.

[11] 3,972,688
[45] Aug. 3, 1976

[54] REACTOR FOR CRACKING HYDROCARBONS

[75] Inventors: Gerhard Cornelius, Bergen-Enkheim; Heinz Jockel, Klein-Gerau; Hans Küpfer, Frankfurt am Main, all of Germany

[73] Assignee: Metallgesellschaft Aktiengesellschaft, Frankfurt am Main, Germany

[22] Filed: Jan. 28, 1975

[21] Appl. No.: 544,722

[30] Foreign Application Priority Data
Mar. 18, 1974 Germany............................ 2412841

[52] U.S. Cl. ........................... 23/288 K; 23/288 M; 23/289; 176/39
[51] Int. Cl.² ........................ B01J 8/00; B01J 8/06; G21D 9/00
[58] Field of Search ............ 23/288 M, 288 K, 289; 165/142; 122/32; 196/110; 176/39, 65

[56] References Cited
UNITED STATES PATENTS

| | | | |
|---|---|---|---|
| 2,361,020 | 10/1944 | Gibb | 23/288 M |
| 2,475,025 | 7/1949 | Huff | 165/142 X |
| 3,109,781 | 11/1963 | Natland | 176/39 UX |
| 3,155,595 | 11/1964 | Schluderberg | 176/65 X |
| 3,230,055 | 1/1966 | Wolfrom | 23/288 M UX |
| 3,534,812 | 10/1970 | Sandri | 122/32 X |
| 3,557,760 | 1/1971 | Romanos | 122/32 |
| 3,859,964 | 1/1975 | Kozeki | 122/32 |
| 3,870,476 | 3/1975 | Marsch | 23/288 M X |

Primary Examiner—Morris O. Wolk
Assistant Examiner—Bradley Garris
Attorney, Agent, or Firm—Burgess, Dinklage & Sprung

[57] ABSTRACT

A reactor for reacting gaseous or vaporized hydrocarbons with water vapor to produce carbon monoxide and hydrogen containing gases in the presence of a catalyst. The catalyst is contained in indirectly heated tubes in a heating zone which contains the gaseous heating fluid. The catalyst tubes extend through the reactor housing and at least partly into a heating zone defined by the reactor housing. The portion of the tubes extending into the reactor housing are surrounded by an inner shielding wall which is permeable to an outer shielding wall disposed within the reactor housing and defining a flow passage therewith.

7 Claims, 3 Drawing Figures

REACTOR FOR CRACKING HYDROCARBONS

BACKGROUND

This invention relates to a reactor for reacting gaseous or vaporized hydrocarbons with water vapor to produce carbon monoxide- and hydrogen-containing gases at temperatures above 700°C and under pressure of 5–80 kg/cm² at catalyst material contained in tubes and indirectly heated in a heating zone, which contains a gaseous heating fluid.

Reactors of this kind are usually described briefly as tubular heaters. The hydrocarbon feedstock may consist, e.g., of natural gas or vaporized naphtha, and a rich gas consisting mainly of methane, carbon monoxide, carbon dioxide, and hydrogen, may be further reacted in the reactor.

Because the hydrocarbons are catalytically cracked to form CO and $H_2$ by an endothermic reaction, the catalyst material must be indirectly heated. Whereas the catalysts comprise in most cases nickel on a heat-resisting support, such as alumina, the reactor which will be described hereinafter is not restricted to the use of a specific catalyst.

Tubular heaters in which a heating gas is used at temperatures above 800°C, preferably about 850°–1100°C and under a pressure of 20 to above 80 kg/cm², preferably 30–60 kg/cm², must have an expensive, pressure-resisting housing.

SUMMARY

The invention minimizes the structural expenditure or the reactor housing. This is accomplished in that the tubes extend through the reactor housing and extend with at least part of their length into the heating zone, which is surrounded by an inner shielding wall, which is permeable to an outer shielding wall, which is disposed within the reactor housing and defines a flow passage therewith.

As a result of these structural features, the heating zone which is at a high temperature is spaced from the reactor housing. At the same time, a gaseous coolant can be passed between the reactor housing and the outer shielding wall. The cooling of the reactor housing increases the stability thereof so that the housing can be made with a relatively low expenditure and at reasonable costs even when it is designed for extremely high pressures and temperatures.

The reactor is preferably intended for the use of a heating fluid which has been heated in a nuclear reactor but is not restricted to such use. Such gas is, e.g., helium, which is used to dissipate heat which has been produced in a nuclear reactor. This helium is then fed into the heating zone of the tubular reactor and at least part of its energy content is used to indirectly heat the catalyst material. The helium leaves the nuclear reactor at temperatures of about 800°–1100°C, preferably 850°–1100°C, and under a pressure of 20–80 kg/cm², preferably 30–60 kg/cm². For a further use of the helium after its use as a heating fluid in the reactor it is suitable that the helium is substantially not pressure-relieved so that it can be returned into the nuclear reactor without need for a high expenditure. The helium delivers part of its sensible heat in the reactor and is then passed out of the reactor and outside the reactor is further cooled to a temperature of about 200°–350°C. This externally cooled helium is returned into the tubular heater to cool the reactor housing and is subsequently returned into the nuclear reactor. This cooling is particularly suitable for that portion of the housing through which the tubes extend and which is also described as a cover plate, the same is supported by a backpressure applied from the outside. For this purpose, a pressure dome is mounted on the reactor over the cover plate and cooled helium is fed through a connecting conduit into the space under the pressure dome.

DESCRIPTION OF THE DRAWING

An embodiment of the reactor structure according to the invention is shown by way of example on the drawing, in which.

DESCRIPTION

Figure 1:
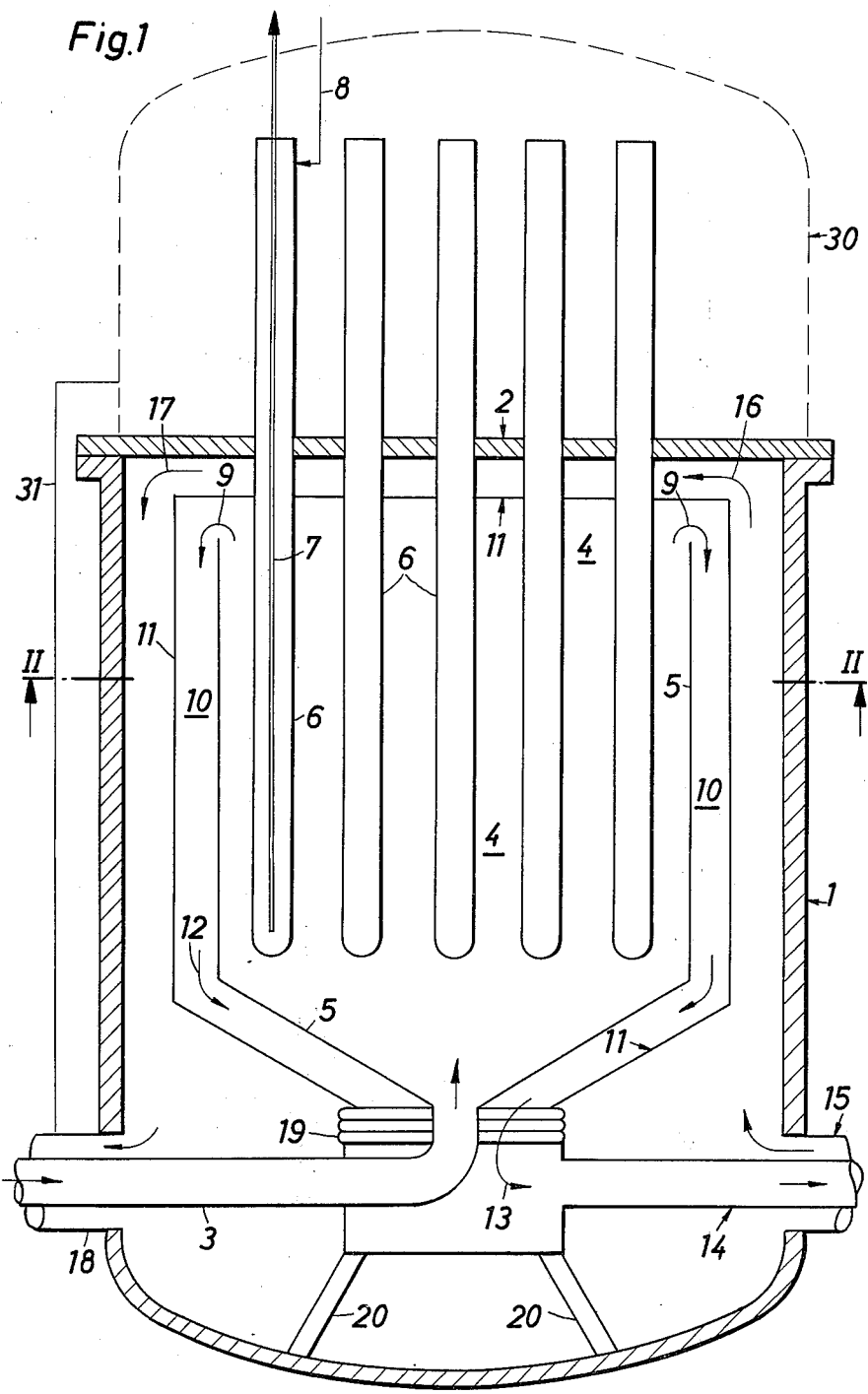
FIG. 1 is a vertical diagrammatic view, partly in section, showing the reactor of the invention.

The tubular heater comprises a housing 1, which includes a cover plate 2. Pressures up to about 80 kg/cm² are maintained within said housing. A conduit 3 for feeding gaseous heating fluid, such as helium, extends through the housing 1. This helium comes suitably from a nuclear reactor and leaves the same at temperatures of about 850°–1100°C and under pressures up to 80 kg/cm², preferably 30–60 kg/cm².

The feed conduit 3 leads into the heating zone 4 of the reactor. This heating zone is surrounded by a funnel-shaped inner shielding wall 5. A large number of tubes 6 extend into the heating zone 4 and contain catalyst material and discharge conduits 7 for product gas. For the sake of clearness, the discharge conduit 7 and a conduit 8 for feeding the feedstock to be reacted are shown only for one tube. Reactor tubes which may be used for this purpose have been described, eg., in the Opened German Specification 1,901,758 and the U.S. Pat. No. 3,713,784.

The inner shielding wall 5 is open-topped so that the heating gas can flow in the direction of arrows 9 into a clearance space 10, which is defined on the inside by the inner shielding wall 5 and on the outside by an outer shielding wall 11. The outer shielding wall 11 is closed at its top and prevents a flow of hot helium from the heating zone 4 to the cover plate 2. In the heating zone 4 the helium delivers part of its sensible heat to the tubes 6 and the chemical reaction carried out in said tubes and the temperature of the helium is thus reduced to about 200°–500°C below the inlet temperature. The helium then flows downwardly in the clearance space 10 (arrows 12 and 13) and leaves the reactor through the discharge conduit 14.

The helium coming from the discharge conduit 14 is conducted outside the reactor housing by means (not shown) through a heat exchanger, in which its temperature is reduced to about 200°–350°C. This cooled helium enters the tubular reactor through a feed conduit 15, which is coaxial with the discharge conduit 14 adjacent to the housing 1. The cooled helium enters the cooling zone between the housing 1 and the outer shielding wall 11 and flows upwardly along the housing.

It is of decisive significance for the stability of the reactor housing that the cool helium flows also along the cover plate 2, as is indicated by the arrows 16 and 17. Between the tubes 6, the helium flows through cooling passages, which are defined by the outer shielding wall and the cover plate. The cool helium leaves the tubular heater through the discharge conduit 18 and is fed for further use to the nuclear reactor. This will not be described more fully herein. The discharge conduit 18 and the feed conduit 3 are preferably coaxial as shown in FIG. 1.

The outer shielding wall 11 is provided near the discharge conduit 14 with a compensator 19, which can elastically deform to take up changes of the length of said wall. Except for the discharge conduit 14, the outer shielding wall constitutes a closed container, which is supported in the housing 1 by feet 20.

Figure 2:
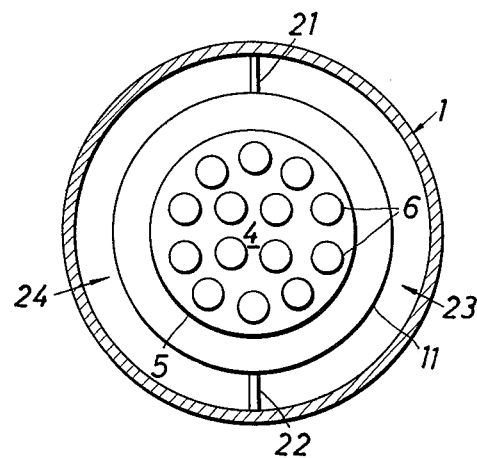
FIG. 2 is a horizontal sectional view taken along line II—II of FIG. 1.

FIG. 2 is a horizontal sectional view showing the tubular heater on a smaller scale and shows the annular zones defined by shielding walls 5 and 11 and the housing 1. Two partitions 21 and 22 bisect the clearance space between the housing 1 and the outer shielding wall 11. One half 23 of said clearance space conducts helium flowing upwardly to the cover plate 2 and the other half 24 conducts the helium which flows to the discharge conduit 18. The partitions 21 and 22 extend in a vertical plane and serves to guide the cooling helium.

Figure 3:
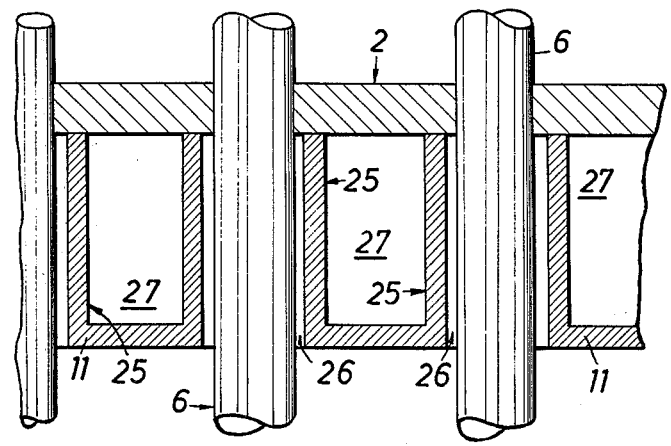
FIG. 3 is an enlarged sectional view from FIG. 1 showing the cover plate and means for cooling the same.

FIG. 3 shows a special disign of the cooling passages which extend under the cover plate 2. Each tube 6 is surrounded by cylindrical members 25 so that a gap 26 is defined between the outside surface of each tube and the inside surface of the surrounding cylindrical member. Hot helium from the heating zone 4 can enter this gap so that the tubes 6 are not directly cooled by the cooling helium which flows in the passages 27.

The outer shielding wall 11 constitutes a bottom between adjacent cylindrical members 25 so that cooling passages 27 are formed, through which cool helium flows. This cooling prevents an overheating of the cover plate 2. Because even a cover plate which is sufficiently cooled must be massive so that it can take up the high pressures, it may be recommendable to relieve the plate 2 by a backpressure. For this purpose, a pressure dome may be used, which is shown in dotted line at 30 in FIG. 1. This dome 30 is connected to the plate 2 and extends in a curved configuration over the top end of the tubes 6. The dome is provided with passages for the product gas discharge conduits 7 and for the conduits 8 for feeding mixed feedstock into the tubes. A connecting conduit 31 is provided between the discharge conduit 18 for cool helium and the dome 30 and causes a helium atmosphere to be maintained under the dome so as to compensate the pressure within the housing 1.

What is claimed is:

1. Reactor for reacting gaseous or vaporized hydrocarbons with water vapor to produce carbon monoxide and hydrogen-containing gases at temperatures about 700°C and under pressures of 5–80 kg/cm$^2$ on a catalyst material contained in tubes extending into a heating zone, the reactor comprising housing means with cover plate means, said tubes extending through said cover plate means into said heating zone and being closed at the end inside the heating zone, each tube containing a concentrically disposed discharge conduit, said heating zone comprising an inner shielding wall means surrounding said tubes and having a conduit feeding gaseous heating fluid from outside the reactor into the heating zone, said inner shielding wall means being concentrically surrounded by outer shielding wall means having a top cover, said inner and said outer wall means defining a clearance space therebetween, said clearance space being open to said heating zone and having a first gas discharge conduit, said first gas discharge conduit being connected to a heat exchanger means outside the reactor, and a gas flow passage defined by said outer shielding wall means, said housing means and said cover plate means, said gas flow passage surrounding said heating zone and being connected to a cooled gas feed conduit from said heat exchanger means and a second gas discharge conduit terminating outside said reactor.

2. Reactor of claim 1 wherein the second gas discharge conduit is coaxial with said conduit for feeding gas which has been heated in a nuclear reactor.

3. Reactor of claim 1 wherein first gas discharge conduit is coaxial with said cooled gas feed conduit.

4. Reactor of claim 1 wherein the outer shielding wall means includes a compensator means for thermal expansion.

5. Reactor of claim 1 wherein the gas flow passage between the reactor housing means and the outer shielding wall means is divided by flow-guiding wall means.

6. Reactor of claim 1 wherein a pressure dome is disposed over said cover plate means, said pressure dome being connected via a conduit with cooled heating fluid.

7. Reactor of claim 1 wherein said cover plate means and the top cover of the outer shielding wall means further define annular cooling conduits concentric with said tubes and communicating with said gas flow passage, said annular cooling conduits surrounding said tubes and defining a gap between the outside surface of each tube and the inside surface of the annular conduits such that heating fluid from the heating zone can enter said gap.

* * * * *